(12) United States Patent
Feld et al.

(10) Patent No.: US 6,749,379 B1
(45) Date of Patent: Jun. 15, 2004

(54) GOLF GREENS MOWER TRAILER

(76) Inventors: Orrin W. Feld, 13434 152nd Rd. North, Jupiter, FL (US) 33478; Ho Phi Tang, 243 Wrena Dr., West Palm Beach, FL (US) 33409

( * ) Notice: Subject to any disclaimer, the term of this patent is extended or adjusted under 35 U.S.C. 154(b) by 0 days.

(21) Appl. No.: 10/382,503

(22) Filed: Mar. 7, 2003

(51) Int. Cl.[7] ................................................ B60P 7/08
(52) U.S. Cl. ................................ 410/22; 410/3; 410/4; 410/7; 410/77; 410/80; 410/19
(58) Field of Search ............................... 410/2, 3, 4, 7, 410/9, 19, 22, 77, 80; 280/63, 400, 789; 248/500, 503

(56) References Cited

U.S. PATENT DOCUMENTS

| 5,503,449 | A | * | 4/1996 | Cameron et al. | |
|---|---|---|---|---|---|
| 5,785,472 | A | * | 7/1998 | Smith et al. | 410/77 |
| 5,795,115 | A | * | 8/1998 | Collins | 410/22 |
| 6,019,566 | A | * | 2/2000 | Thier et al. | |
| 6,099,219 | A | * | 8/2000 | Bartholomay | 410/20 |
| 6,382,891 | B1 | * | 5/2002 | Bellis, Jr. | 410/7 |
| 6,419,431 | B1 | * | 7/2002 | Kuhns | 410/2 |
| 6,464,436 | B1 | * | 10/2002 | Davis | 410/7 |
| 2002/0109345 | A1 | * | 8/2002 | Dufty | |
| 2002/0148870 | A1 | * | 10/2002 | Zimmerman | |

* cited by examiner

Primary Examiner—Stephen T. Gordon
(74) Attorney, Agent, or Firm—C. J. Husar, Esq.

(57) ABSTRACT

A u-shaped trailer frame that includes a drawbar that is connectable to a trailer hitch. The u-shaped frame includes forward holding means and also a pair of axle supports for the wheel axles of the greens mower once the wheels have been removed. The trailer includes a pair of wheels that have special mounts, allowing the frame to be positioned as close to ground as possible, thus eliminating the need for any pivot members to raise the greens mower as found in the prior art. A special offset draw bar configuration is also provided to allow the ground hugging trailer frame to be attached to a conventionally located trailer hitch mounting.

8 Claims, 4 Drawing Sheets

FIG. 1

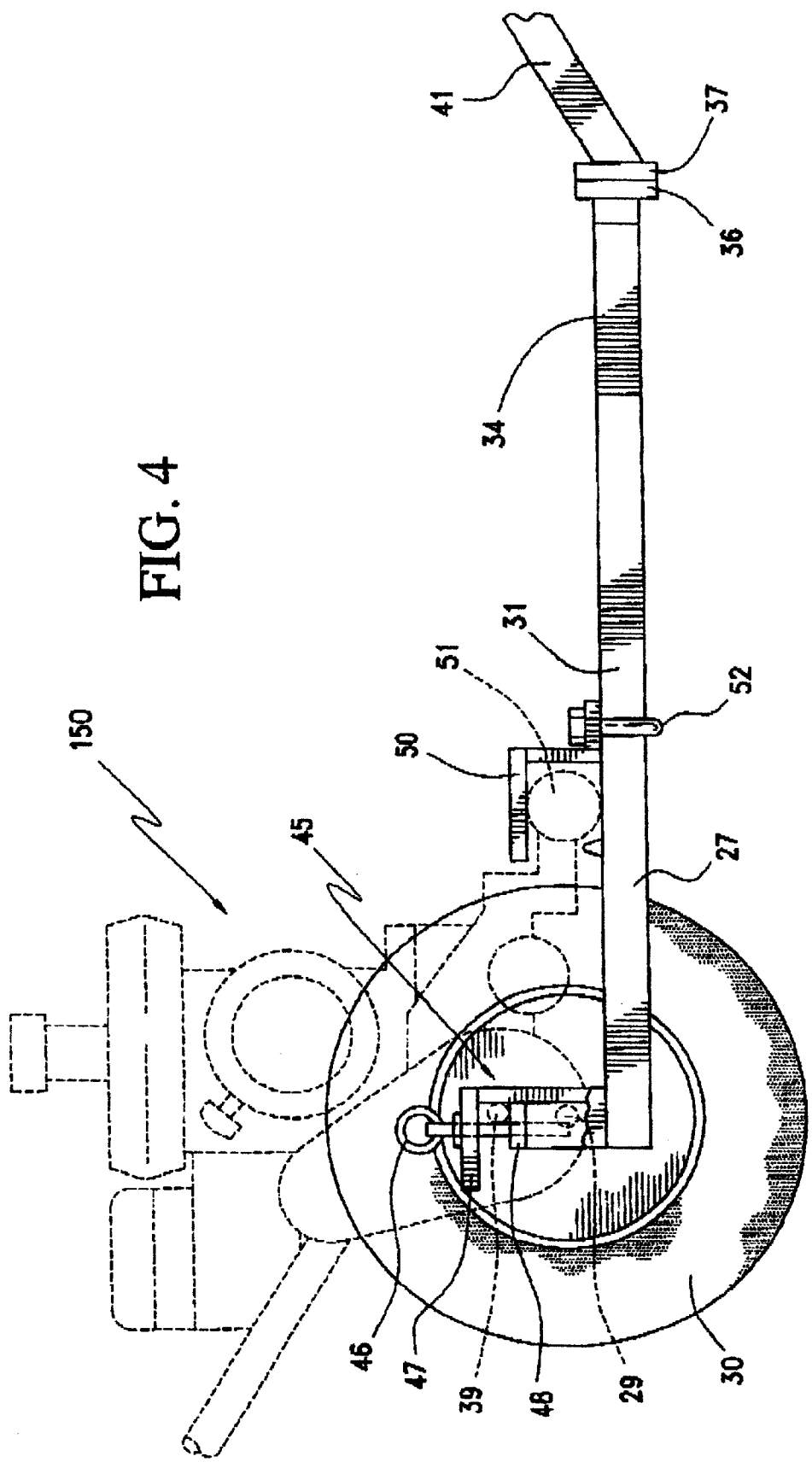

GOLF GREENS MOWER TRAILER

BACKGROUND OF THE INVENTION

The present invention relates to trailers and more specifically, it relates to a trailer for golf course greens mowers. The structural design of conventional trailers used for this purpose frequently contributes to damaged cutting reels; the reels are usually damaged when greens mowers are towed from green to green or when placed on and/or removed from conventional trailers. Usually, the cutting reels are invariably brought into contact with conventional trailer frames, thus damaging the reels, or at the very least, dulling the cutting reels, requiring sharpening prior to its next use; thus adding time to completion of the particular job.

In view of the above noted deficiencies of the known currently available golf course greens mowers, applicants have designed a trailer that eliminates the above noted problems. Applicants have designed a trailer which has a cavity, formed by its frame members, for receiving the mower. The trailer frame includes a forward locking or securing device and a pair of rearwardly disposed supports for engaging the front roller of the machine whereby the mower is suspended from its mountings on the trailer. A unique feature of the trailer is the particular manner of mounting the wheels on the trailer. The trailer wheels are positioned such that the frame of the trailer has a low profile that is in close proximity to the ground, thus eliminating the need for any ramps. Also, each wheel of the trailer includes an axle that screws into the frame versus the conventional hard-weld arrangement of conventional trailers. This screw-in axle configuration facilitates the replacement of wheels and axles which are frequently damaged when a trailer hits a tree or other obstruction on a golf course.

DISCUSSION OF THE PRIOR ART

A pre-examination prior art search was made in the appropriate classes and sub classes in the files of the United States Patent Office and revealed the following prior art documents.

U.S. Pat. No. 6,019,566—issued to Their et al on Feb. 1, 2000—discloses a greensmower trailer that includes a pivotable ramp for loading and unloading a plurality of mowers. It also includes a forward bracket for holding the mowers in place during transit and also rear latching members for securing the mower in place. The rear latching lever when moved into latching position also causes the ramp to swing upwardly to its raised transport position.

U.S. Pat. No. 6,464,436—issued to Davis on Oct. 15, 2002—discloses another greens mower trailer that includes a ramp leading to a perforated deck 40. The deck includes a plurality of forward latch supports and also a pair of rear left and right axle supports of the mower.

Pub. No.: US 2002/0109345—by Dufty and published on Aug. 15,2002—discloses a trailer frame supported by a pair of ground engaging wheels. A pivot frame is pivotally attached to the trailer frame to allow a mower to be attached thereto. The trailer frame includes a drawbar for connection to a prime mover.

Pub. No.: US 2002/0148870—by Zimmerman and published on Oct. 17, 2002—discloses a transporter for a greens mower The transporter is attached to a utility vehicle and allows the greens mower to be attached thereto. Once the transporter is pivotally attached to the utility vehicle, an arm that is interconnected to a transverse member is utilized to raise the greens mower sufficiently above ground level to allow its movement from greens to greens.

SUMMARY OF THE INVENTION

A review of the above cited art reveals that the known transporters for greens mowers are transported by either one of two styles. The first one is of the trailer type that includes a ramp for loading the greens mower onto a deck surface of the trailer and is secured thereon during movement. The second type of transporter is the type that utilizes a pivot arm for raising the transporter off the ground surface for movement from greens to greens. Applicants have developed a U-shaped trailer frame that includes An offset drawbar that is connectable to a trailer hitch. The U-shaped frame includes forward holding means and also a pair of axle supports for the wheel axles of the greens mower once the wheels have been removed. The trailer includes a pair of wheels that have special mounts, allowing the frame to be positioned as close to ground as possible, thus eliminating the need for any pivot members to raise the greens mower as found in the prior art. A special offset draw bar configuration is also provided to allow the ground hugging trailer frame to be attached to a conventionally located trailer hitch mounting.

OBJECTS OF THE INVENTION

An object of the invention is to provide a trailer for a greens mower that is inexpensive and can readily be attached to a utility vehicle.

A further object of the invention is to provide a trailer that is generally U-shaped and includes forward and rearward attachment points for the greens mower.

Another object of the invention is to provide a trailer for a greens mower that will accommodate a plurality of the most popular greens mowers.

Yet another object of the invention is to provide a trailer with a supporting frame that is close to the ground and requires only inches of mower lifting to allow easy mower attachment to the trailer.

Still another object of the invention is to provide a trailer frame that includes a forward draw bar that is vertically offset from the trailer frame to accommodate hitch attachment and the low ground clearance of the frame.

A still further object of the invention is to provide a trailer for a greens mower that allows the mower to be moved from green to green without any damage to the cutting reel of the mower.

Yet another object of the invention is to provide a trailer for a greens mower that can be used for safely moving the mower without any fear of inadvertent changing of the cutting settings.

These and other objects of the invention will become more apparent hereinafter. The instant invention will now be described with particular reference to the accompanying drawings that form a part of this specification wherein like reference characters designate the corresponding parts in the several views.

BRIEF DESCRIPTION OF THE DRAWINGS

FIG. 1 is a perspective view of the novel greens mower trailer with a greens mower shown thereon in phantom.

FIG. 4 is another partial side view of the trailer illustrating the greens mower loaded on the trailer in phantom.

DETAILED DESCRIPTION OF THE DRAWINGS

Figure 1:
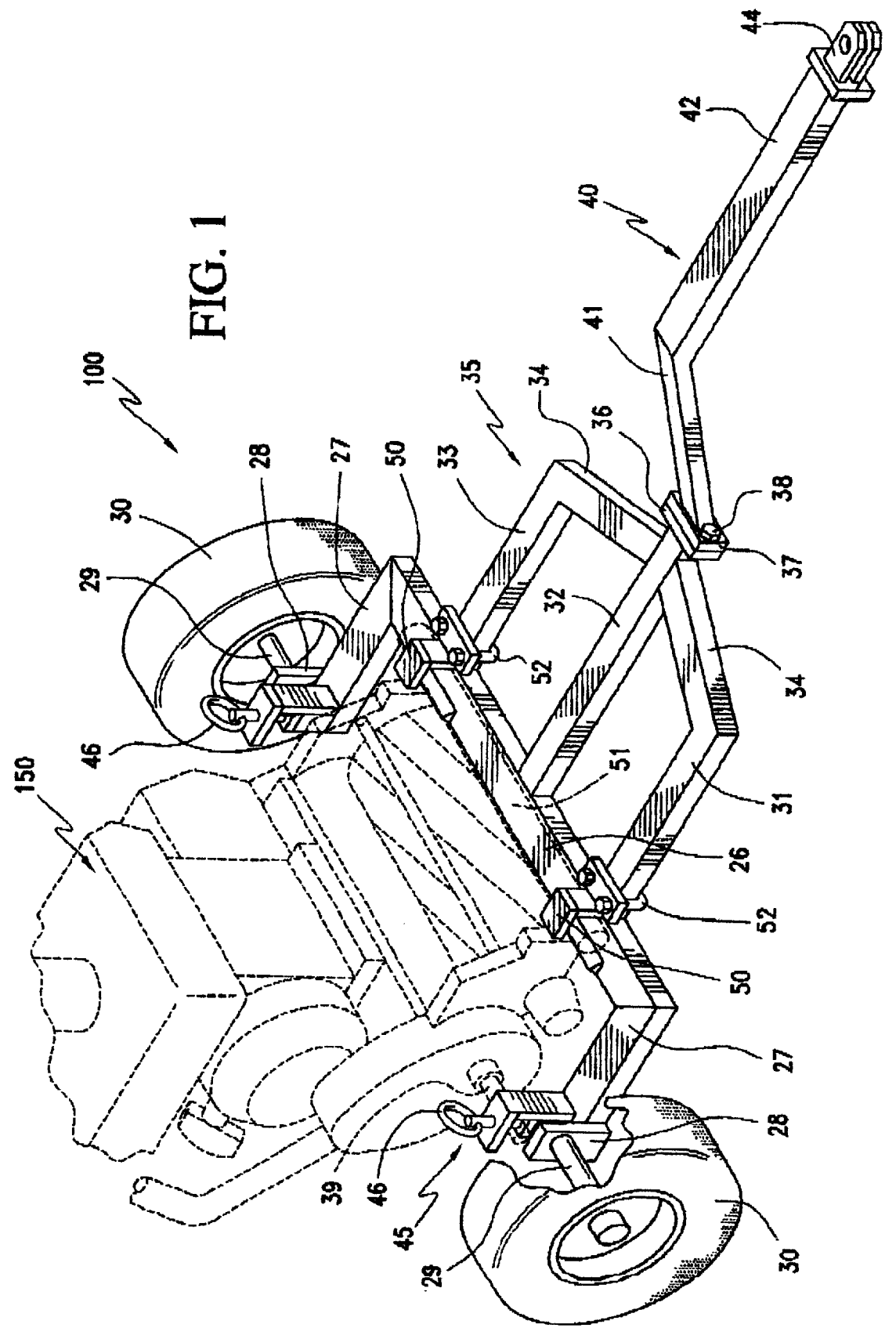
Figure 2:
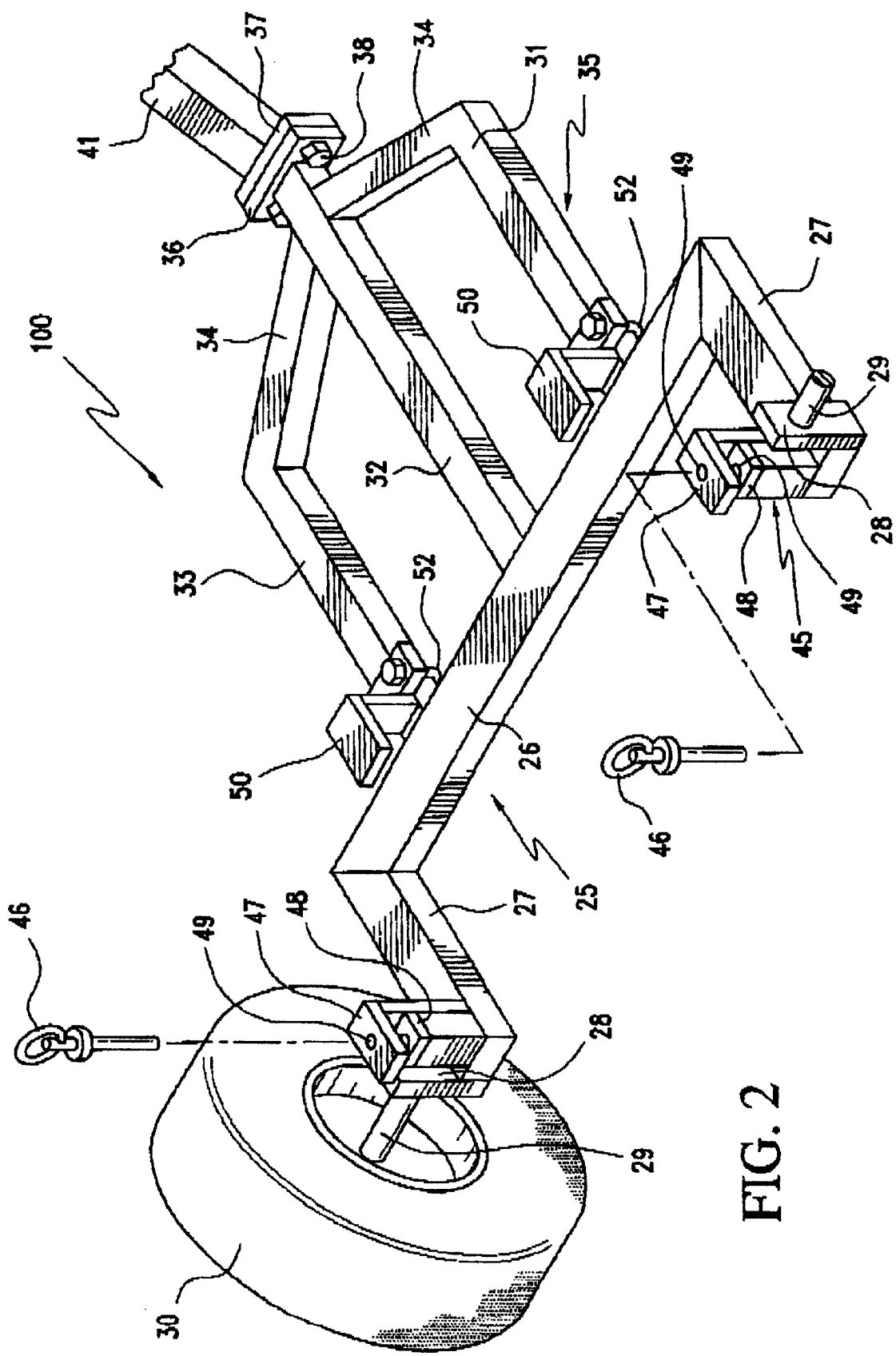
FIG. 2 is partial plan view of the trailer with one wheel removed to illustrate the wheel support of the trailer and the mower support.

Referring now to FIG. 1, there is illustrated a frontal perspective view of the novel greens mower trailer indicated generally by reference numeral 100 with a greens mower 150 illustrated in phantom. As shown, trailer 100 is comprised of a rear frame portion 25 that includes an elongate horizontal frame member 26 and a pair of arms 27 extending therefrom at right angles. As illustrated, each arm 27 includes a first support block 28 projecting upwardly from an exterior surface thereof for receiving a threaded axle 29 of a ground engaging transport wheel of the trailer 100. A second support block 45 is attached to each of arms 27 on the inboard side thereof for receiving a wheel axle 39 of greens mower 150 (shown in phantom).

Attached to the elongate horizontal member 26 are three spaced perpendicularly mounted members 31, 32, and 33 with center member 32 lying on the centerline of the trailer 100. The distal ends of members 31, 32 and 33 are interconnected by two diagonal members 34 to form forward frame portion 35. Attached to forward frame portion 35 is mounting plate 36 that mates with mounting plate 37 of offset drawbar 40 that is secured thereto by a pair of bolts 38. Drawbar 40 includes a first diagonal portion 41 that is followed by a second horizontal portion 42 with the opposite remote end of drawbar 40 including attachment means 44 for attachment to a utility transport vehicle (not shown).

Each arm 27 further includes a second support block 45 for receiving and holding a wheel axle 39 of a greens mower therein for transport purposes. A quick release pin 46 is inserted into second support block 45 for securely holding axles 39 of greens mower 150 therein. Further details of mounting a greens mower 150 therein will be described in greater detail with respect subsequent figures.

In addition to second support blocks 45 for receiving axles 39 of greens mower 150 when in transit, a pair of forward clamping members 50 are adjustably mounted on forward frame members 31 and 33 by u-bolts 52 thus allowing for forward movement of clamping members 50 along their respective frame members 31 and 33, depending upon the manufacturer of the greens mower. Clamping members 50 engage front roller 51, (shown in phantom) when u-bolts 52 are tightened and aid in the securement of greens mower 150 when in transit. Inasmuch as the overall dimensions of greens mowers vary slightly, this adjustment feature was included to accommodate greens mowers manufactured by each of TORO, JOHN DEERE AND JACOBSEN.

Turning now to FIG. 2, there is shown a perspective plan view of trailer 100 with the right wheel unattached to provide a clear picture of first support member 28 and second support member 45 and their relation to arm 27 with only a portion of trailer wheel axle 27 shown projecting from first support 28. Included in this view are a pair of quick release pins 46 for securing wheel axles 39 of green mower 150 when mounted in second support member 45.

Each quick release pin 46 is used in conjunction with second support member 45 that receives axle 39 between upper plate 47 and lower plate 48 therebetween and pins 46 are inserted into aligned bores 49 of plates 47 and 48 to prevent movement of greens mower 150 during transit. Although quick release pins 45 are used to secure axles 39 in place on second support 45, other suitable means could be utilized such as a threaded eyebolt into threaded bores 49.

Figure 3:
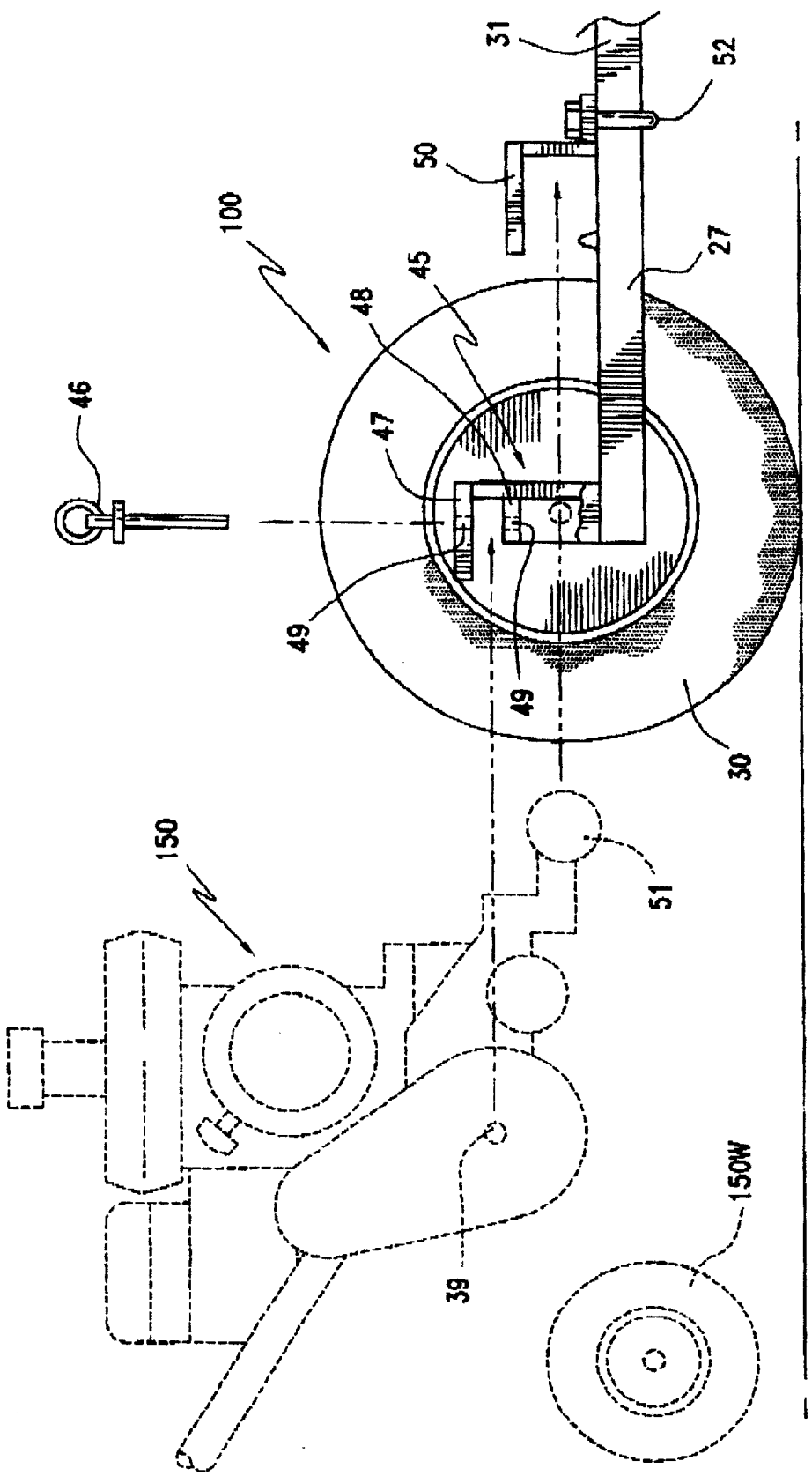
FIG. 3 is another partial view of the trailer showing the manner in which the greens mower engages the trailer supports.

FIG. 3 is a side partial view of trailer 100 with greens mower 150 shown in phantom. As illustrated, wheel 150W of greens mower 150 has been removed exposing axle 39 and front roller 51 which, when greens mower 150 is moved forward, will engage second support 45 and clamping member 50, respectively, to securely hold greens mower 150 in place when moved from greens to greens. As shown, clamping member 50 can slide to the right on frame member 31 and thus can accommodate a variety of different greens mower manufacturers, since the distance from axle 39 to the location of front roller 51 may vary depending on manufacturer.

FIG. 4 is a partial side view illustrating the position of greens mower 150 relative to trailer 100 after it has been raised into its secured position with respect to clamping member 50 and second support member 45. As shown, greens mower wheel axle 39 is secured in second support 45 between upper plate 47 and lower plate 48 with quick release pin 46 preventing axle 39 from withdrawing therefrom. Additionally, front roller 51 is shown securely mounted to frame portion 25 by adjustable clamping member 50.

While the invention has been described in its preferred embodiment, it is to be understood that the words that have been used are words of description rather than words of limitation and that changes may be made within the purview of the appended claims without departing from the full scope or spirit of the invention.

Having thus described our invention, we claim:

1. A trailer for transporting a greens mower from greens to greens, said trailer comprising:

a first frame portion comprising an elongated frame member with a pair of arms secured to opposite ends thereof and forming a right-angle thereto;

each of said pair of arms including first and second support means;

a forward frame portion comprised of a plurality of perpendicularly mounted frame members permanently secured to said elongated frame member and extending forward thereof on a same horizontal plane as said elongated frame member;

drawbar means attached to the forwardmost portion of said forward frame portion;

said plurality of perpendicularly mounted frame members including adjustable support means for engaging a forward portion of a greens mower when mounted thereon; and said first support means of said pair of arms providing support for a pair of trailer ground engaging wheels.

2. A trailer for transporting a greens mower from greens to greens as defined in claim 1 wherein said second support means provides additional support for a greens mower component when mounted thereon.

3. A trailer for transporting a greens mower from greens to greens as defined in claim 2 wherein said component supported is a front roller of a greens mower when mounted thereon.

4. A trailer for transporting a greens mower from greens to greens as defined in claim 1 wherein said drawbar means comprises a first diagonal portion followed by a second interconnected horizontal portion that includes attaching means for attachment to a utility transport vehicle.

5. A trailer for transporting a greens mower from greens to greens as defined in claim 1 wherein said adjustable support means of said forward frame portion includes a pair of spaced clamping members that are adjustably attached to said perpendicularly mounted frame members for receiving a front roller of a greens mower when mounted thereon.

6. A trailer for transporting a greens mower from greens to greens as defined in claim 1 wherein said adjustable support means can be adjusted along said forward frame portion to accommodate greens mower components of varied lengths.

7. A trailer for transporting a greens mower from greens to greens as defined in claim 6 wherein said greens mower components include a front roller.

8. A trailer for transporting a greens mower from greens to greens as defined in claim 1 wherein said first frame portion and said forward frame portion lie on a common horizontal plane which is below a centerline of said trailer ground engaging wheels thus providing a trailer that is close to the ground surface and requires minimal lifting to get a greens mower placed thereon.

\* \* \* \* \*